(12) United States Patent
Good et al.

(10) Patent No.: US 6,199,742 B1
(45) Date of Patent: Mar. 13, 2001

(54) METHOD AND TOOLING ARRANGEMENT FOR DIFFUSING BRAZE WEIGHT PRESSURE IN BRAZING OF AEROSTRUCTURE HONEYCOMB SANDWICH PANEL

(75) Inventors: Steven A. Good; Peter D. Pallag, both of San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 09/249,432

(22) Filed: Feb. 12, 1999

(51) Int. Cl.$^7$ .................. B23K 31/12; B23K 37/00; B23K 31/02

(52) U.S. Cl. .................. 228/106; 228/5.5; 228/44.3; 228/181; 228/226

(58) Field of Search .................. 228/106, 181, 228/214, 225, 226, 228, 4.1, 5.5, 19, 33, 44.3, 49.5

(56) References Cited

U.S. PATENT DOCUMENTS

| | | | | |
|---|---|---|---|---|
| 3,598,953 | * | 8/1971 | Campbell | 219/117 |
| 3,633,267 | * | 1/1972 | Kent et al. | 29/493 |
| 3,783,969 | * | 1/1974 | Pall | 181/33 G |
| 3,795,288 | * | 3/1974 | Pall | 181/142 |
| 3,802,145 | * | 4/1974 | Scanlon | 52/615 |
| 3,846,903 | * | 11/1974 | Rupert et al. | 29/487 |
| 4,013,210 | * | 3/1977 | Deminet | 228/106 |
| 4,037,751 | * | 7/1977 | Miller et al. | 220/9 R |
| 4,356,678 | * | 11/1982 | Andrews et al. | 52/799 |
| 4,411,380 | * | 10/1983 | McWithey et al. | 228/181 |
| 4,416,739 | * | 11/1983 | Turner | 204/32 R |
| 4,725,509 | * | 2/1988 | Ryan | 428/607 |
| 4,849,276 | * | 7/1989 | Bendig et al. | 428/117 |
| 4,856,963 | * | 8/1989 | Klapproth et al. | 415/190 |
| 4,869,421 | * | 9/1989 | Norris et al. | 228/181 |
| 4,919,366 | * | 4/1990 | Cormier | 244/160 |
| 4,925,740 | * | 5/1990 | Norris et al. | 428/547 |
| 5,564,066 | * | 10/1996 | Abiven | 428/549 |
| 5,728,309 | * | 3/1998 | Matsen et al. | 219/633 |
| 5,811,168 | * | 9/1998 | Rasky et al. | 428/102 |
| 5,830,289 | * | 11/1998 | El-Soudani | 148/524 |

* cited by examiner

*Primary Examiner*—Patrick Ryan
*Assistant Examiner*—Zidia T. Pittman
(74) *Attorney, Agent, or Firm*—Baker Botts L.L.P.

(57) ABSTRACT

A method of brazing together a lightweight metallic aerostructure sandwich panel having at least two spaced face sheets and an intermediate honeycomb core layer comprises:

providing a tooling base having a determinable upper surface;

assembling spaced upper and lower metal face sheets and an intermediate metal honeycomb core layer together with at least one layer of braze material upon the upper surface of the tooling base to provide an unbrazed aerostructure panel;

positioning a layer of conformable working honeycomb core upon the upper face sheet;

positioning apressure means upon the layer of conformable working honeycomb core to provide downward pressure upon the layer of conformable working honeycomb core and causing the conformable working honeycomb core to provide a uniform downward pressure over the upper face sheet of the unbrazed aerostructure panel; and subjecting the unbrazed aerostructure panel to a predetermined cycle of elevated temperature and time to permit the layer of braze material to be melted and thereby provide a brazed integral aerostructure panel. This method, and the aerostructure panel obtained using the method, advantageously avoid the problems of uneven weight distribution to the face sheets during the brazing process, and the quality of the brazed joints is enhanced. The method of this invention also reduces wear and tear on the braze furnace and enhances part throughput via reduced braze cycle time.

28 Claims, 1 Drawing Sheet

METHOD AND TOOLING ARRANGEMENT FOR DIFFUSING BRAZE WEIGHT PRESSURE IN BRAZING OF AEROSTRUCTURE HONEYCOMB SANDWICH PANEL

BACKGROUND OF THE INVENTION

1. Field of the Invention

The present invention relates generally to the field of brazing aerostructure panels and more particularly, but not by way of limitation, to an improved method and tooling arrangement for diffusing braze weight pressure in the brazing of a lightweight aerostructure honeycomb sandwich panel.

2. Description of the Prior Art

In the construction of certain aerostructures it is often necessary to provide metallic honeycomb sandwich panels which may then be secured together in a suitable manner to provide the ultimate aerostructure article. Such metallic honeycomb sandwich panels are often formed by brazing a central metallic honeycomb core layer to upper and lower face sheets. Such panels may have a configuration that is flat or which may have a certain desired curvature in their outer surfaces. Since such aerostructure articles may be subject to elevated temperatures, the panels may be constructed of metals such as Inconel and titanium among others and may also be relatively thin in thickness. Thus, a thin lightweight honeycomb sandwich panel is commonly constructed of thin sheets of Inconel or titanium and the honeycomb core layer is also fabricated of thin sheet stock.

It is common to fabricate such lightweight metallic honeycomb sandwich panels by brazing the opposing face sheets to the central honeycomb core layer in a furnace which subjects such panel to an elevated temperature over a period of time in a predetermined braze cycle. During such braze cycle it is essential to apply a uniform pressure to such face sheets to achieve a complete brazing of such face sheets to the edges of the honeycomb layer without experiencing a disbond condition at certain edges of the honeycomb layer or at the edge of the panel. Various arrangements have been proposed in the past to ensure that a uniform pressure is applied to such face sheets of the aerostructure panel. The arrangement that has found most favor in the art involves the use of a weighted pan that is positioned upon the upper face of the panel during the braze cycle to apply pressure to such panel assembly. Such a weighted pan, termed a "flexweight pan" in the art, is commonly constructed with a thin foil, for example 0.003" in thickness, as the bottom panel of the pan. When the pan is filled with a suitable weight such as tungsten pellets the pan will apply a pressure through the foil bottom panel which will conform to the surface configuration of the upper face sheet of the panel assembly. While an attempt is made to uniformly distribute the tungsten pellets over the thin bottom of the pan, nonetheless, because the face sheets of the panel assembly are so very thin, often in the neighborhood of 0.006", the distribution of such weight upon such face sheet is not applied uniformly to the face sheet and localized "heavy spots" are produced on such face sheet. These heavy spots can locally deform the thin face sheet of a panel assembly and create intra-cellular dimpling of the face sheet over the contacting edges of the honeycomb core layer. On the other hand, "light spots" may be produced on such face sheet of the panel assembly and cause a lack of intimate contact between the face sheet and the layer of honeycomb core thereby creating a disbond between such face sheet and the honeycomb core layer when the panel assembly is subjected to a braze cycle.

Also, differences in the coefficient of thermal expansion (CTE) between the material of the bottom panel of the pan and the materials of the face sheets of the panel assembly can also contribute to unacceptable wrinkling of a face sheet. Attention has been given to overcoming this CTE problem by interposing multiple layers of thin metal sheets, termed "slip sheets" between the bottom panel of the weighted pan and the face sheet of the panel assembly and lubricating such slip sheets with suitable lubricants termed "stop-off" compounds. In addition, a very slow time consuming heat up rate of the furnace for the ultimate brazing temperature of the brazing cycle is imposed. Thus, the expense of operating the furnace in which such a brazing operation is performed is significant because of the extensive time required to complete such a brazing cycle. Unfortunately, such a slow heat up rate to a brazing condition can also significantly adversely affect the properties of the face sheets and the braze material, as well, of the panel assembly. Thus, it is apparent that a present need exists in the state of the art today for an improved method and tooling arrangement for diffusing braze weight pressure in the brazing of lightweight aerostructure honeycomb sandwich panels and overcoming the shortcomings of the methods in present use.

Although the advances in techniques for brazing such aerostructures are note-worthy to one extent or another and are generally acceptable, none achieves the objectives of an efficient, reliable, inexpensive method of providing tooling to provide a uniform pressure to lightweight aerostructure panel assembly to be brazed that permits a brazing cycle to be completed in a minimum time period.

It is a general object of this invention to provide a method of tooling for the brazing of a lightweight aerostructure honeycomb sandwich panel assembly that provides a uniform pressure to such panel assembly during the braze cycle to preclude wrinkling of the face sheets of the panel assembly during the braze cycle.

It is a further general object of the invention to reduce the cost of the brazing cycle by providing a tooling arrangement that permits the braze cycle to be completed more quickly while also increasing the quality of the brazed panel assembly.

It is a further general object of this invention to provide an improved method of tooling for brazing a honeycomb sandwich panel that is less expensive in use, provides a superior brazed panel, and provides ease in use.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiments in addition to the scope of the invention defined by the claims taken in conjunction with the accompany drawings.

SUMMARY OF THE INVENTION

Briefly stated, the present invention contemplates providing an improved method and tooling arrangement for brazing a lightweight aerostructure metallic honeycomb sandwich panel having upper and lower face sheets and a central honeycomb core layer. In a preferred embodiment of the invention a graphite tooling base having a determinable upper surface is provided for receiving the panel assembly to be brazed. A slip sheet is positioned upon the upper surface to the tooling base and a panel assembly comprising upper and lower face sheets and an intermediate honeycomb layer together with an appropriate foil braze is positioned upon the slip sheet. The face sheets and the honeycomb layer of the panel assembly are commonly composed of a metal such as Inconel or titanium. The slip sheet in such an application is generally composed of a suitable Corrosion REsistant Steel (CRES) which has a thickness generally the same as that of the lower face sheet of the panel assembly. Suitable lubricating agents termed "stop-off" materials are applied to both surfaces of the slip sheet to minimize any tendency of the lower face sheet to wrinkle due to differences of the coefficient of thermal expansion of the graphite tooling base, the slip sheet and the tooling base. Also, such stop-off agents and the slip sheet preclude any tendency of excess braze material adhering to the tooling surface and to preclude any tendency of the panel assembly to stick to the tooling base.

A pressure means in the form of a pan having a thin conformable bottom and containing a number of heavy metal pellets, such as tungsten pellets, is used to impart a downward pressure upon the panel assembly to ensure intimate contact of the honeycomb core layer and the face sheets. To ensure that this pressure is applied uniformly to the upper face sheet of the panel assembly, a suitable conformable working honeycomb core layer is interposed between the pan and the upper face sheet. Suitable lubricated slip sheets are interposed on each side of the working honeycomb core layer for the same purposes as the lubricated slip sheets interposed between the tooling base and the lower face sheet of the panel assembly.

By providing a flexible metallic honeycomb core layer between the weighted pan and the upper face sheet of the aerostructure panel permits the downward pressure exerted by the weighted pan to be diffused further on the face sheet. The flexibility of the working honeycomb core layer minimizes small offsets between the part and any tooling aids used to maintain dimensional relationships. This helps also to prevent disbonds in areas of low pressure and possible misalignment or unwanted core dissolution in areas of high pressure.

Use of the metallic working honeycomb core layer also permits increased heat up rates of the braze cycle to be used as the working honeycomb core layer is free to expand or contract without dragging the relatively thin upper face sheet along with it. Thus, the length of the braze cycle is materially reduced. To ensure that the perimeter portion of the panel assembly are suitably brazed a tooling honeycomb core layer having loosely contacting upper and lower face sheets and also having the same thickness as the adjacent edge portion of the panel assembly is arranged around the perimeter of the panel assembly and is interposed between the lubricated upper slip sheet means adjacent to the working core layer and the lubricated slip sheets adjacent to the tooling base. In some applications, an additional working core layer may be interposed between the tooling base and the lower face sheet of the panel assembly. Also, it would be within the scope of the invention to interpose the single layer of working honeycomb core between the tooling base and the lower face sheet if the thicknesses of the upper and lower face sheets of the panel assembly would indicate that the advantages of the invention could be realized more filly in that arrangement for that particular panel configuration.

The foregoing has outlined rather broadly the more pertinent and important features of the present invention in order that the detailed description of the invention that follows may be better understood so that the present contribution to the art may be more fully appreciated. Additional features of the invention will be described hereinafter which form the subject of the claims of the invention. It should be appreciated by those skilled in the art that the conceptional and the disclosed specific embodiment may be readily utilized as a basis for modifying or designing other purposes of the present invention. It should also be realized by those skilled in the art that such equivalent constructions and methods do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which.

DETAILED DESCRIPTION OF THE PREFERRED EMBODIMENT

Figure 1:
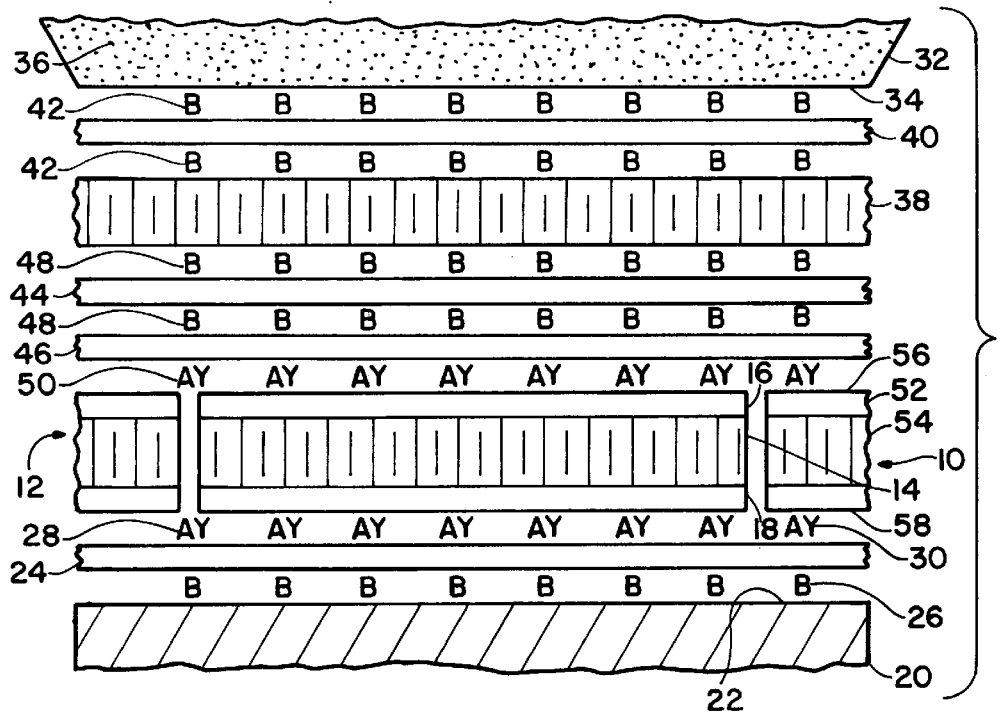
FIG. 1 is a slightly exploded sectional view of a tooling arrangement for a lightweight aerostructure panel constructed in accordance with a preferred embodiment of the present invention.

Referring to the drawings in detail and in particular to FIG. 1, reference character 10 generally designates a tooling arrangement for practicing a preferred embodiment of the present invention. For ease of illustration the FIGURES illustrate the novel tooling arrangement of the invention in a slightly exploded view to better show the various elements commonly used in the practice of this invention. The invention 10 contemplates an improved tooling arrangement for brazing a lightweight aerostructure honeycomb sandwich panel generally designated 12. The panel 12 illustrated in FIG. 1 is shown as having a central honeycomb core layer 14 and upper and lower face sheets 16 and 18 that are to be brazed together to provide a metallic integral honeycomb sandwich panel. While the panel 12 is illustrated as being planar in configuration, such a panel could have other configurations A typical aerostructure panel 12 would have face sheets 16 and 18 which are composed of Inconel 617 or titanium and that have a thickness of 0.006". The core 14 would comprise Inconel 617 or titanium having a thickness of 0.0015" and a center to center distance of 3/16". The panel 12 itself would have a thickness of around 0.500" in a typical application. A suitable braze material (not shown) would be inserted into the unbrazed panel assembly, typically by placing a thin foil braze layer on the upper and lower surfaces of the central honeycomb core layer 14 as is common in the art.

A suitable tooling base 20 that is typically made of graphite is provided with an upper tooling surface 22 that has a determinable surface that will determine the shape of the lower face sheet 18 of the panel 14. A suitable slip sheet 24 having a thickness generally the same as the adjacent face sheet of the panel assembly 12 which in the illustrated example, is 0.006" would be positioned between the upper surface 22 of the tool 20 and the lower face sheet 18 of the panel 12. The slip sheet 24 would be preferably composed of Corrosion REsistant Steel (CRES) as is common in the art. The slip sheet 24 is suitably lubricated by lubricating agents termed "stop-off" in the art. A stop off agent 26, shown in FIG. 1 as the letters "B", that is primarily a boron compound (Boron Nitride), $B_2N_3$ in a carrier solution, is sprayed or painted onto the slip sheet 24 on the surface facing the tooling base 20. A typical stop-off used for its high lubricity in this application is Nicrobraz Orange Type 1 made by Wall Colinonoy Corp. of Madison Heights, Mich.

A stop-off agent 28, shown in FIG. 1 by the letters "A", and having medium lubricity is similarly applied to the upper surface of the slip sheet 24. The stop-off agent 28 which in the illustrated embodiment is primarily alumina, $AL_2O_3$, in a carrier solution, is sprayed onto the slip sheet 24. A typical stop-off used in this application is Nicrobraz White Type 1 also made by the Wall Colmonoy Corp.

After application of the stop-off agent 28, yet another stop-off agent 30 having low lubricity is applied over stop off agent 28 when the face sheet 18 is titanium but is not applied to such face sheet when it is composed of Inconel as it contains nickel. The stop off agent 30 also illustrated by the letter "Y", used in a typical application is Stopyt 62A made by Wesgo located in Belmont, Calif. The stop off agent is primarily yttria, $Y_2O_3$, in a suitable solution.

A pressure means is provided to apply a downward pressure to the panel 12 to ensure intimate contact of the face sheets 16 and 18 with the central honeycomb core layer 14 during the braze cycle. In the illustrated embodiment of the invention this pressure means takes the form of a pan 32 having a conformable bottom panel 34 that is preferably as thin as 0.002" to 0.003" in thickness. The pan 32 is filled with heavy metal pellets 36, such as tungsten pellets, that are preferably uniformly distributed over the bottom panel 34 to provide a desired downward pressure while the panel 34 conforms to the surface of the upper sheet 16 of the article 12. While this pressure pan, termed a "flexweight", is intended to maximize the uniform distribution of weight downwardly onto the panel assembly 12 to be brazed, in practice it is found that the distribution of weight in the pan is not applied evenly across the surface of the face sheet of a panel assembly and produces localized "heavy spots" that can locally deform the thin face sheet of a brazed panel and create intracellular dimpling. Also, differences in the coefficient of thermal expansion (CTE) between the pan and materials of the aerostructure panel to be brazed can also lead to wrinkling of the thin face sheet of the panel. Although control of the CTE is attempted in the prior art practice by using multiple slip sheets, coating such slip sheets with lubricating stop-off compounds and using a slow time consuming heat up rate in the furnace to the region of the brazing temperature, such approaches have not been found to be entirely effective. The slow heat up rate is very time consuming and adds expense to the manufacture of a panel and can significantly adversely affect the properties of the face sheets of the aerostructure panel and of the braze material as well.

The present invention overcomes these problems by positioning a layer of flexible conformable metallic honeycomb core layer 38 between the pressure pan 32 and the upper face sheet 16 of the panel 12. The honeycomb core layer 38 is termed for present purposes a "working" core since it is conformable to the shape of the face sheet 16 of the panel 12.

A suitable slip sheet 40 which in the illustrated embodiment is 0.002" in thickness and composed of a suitable CRES material, is interposed between the bottom sheet 34 of the pan 32 and an upper surface of the working honeycomb core 38. A suitable stop-off lubricating material 42 also designated by the letter "B" is applied to each side of the slip sheet 40 and is preferably the same material as the stop-off material 26 applied to the slip sheet 24 on the side facing the tooling base 20.

Multiple slip sheets are then interposed between the lower surface of the working core 38 and the upper face sheet 16 of the panel 12, A first slip sheet 44 is preferably composed of a suitable CRES material and has a thinness of around 0.002" for the illustrated application. A second slip sheet 46 is positioned between the first slip sheet 44 and the upper sheet 16 of the panel assembly to be brazed. The second slip sheet 46 is preferably the same thickness as the face sheet, which in the illustrated application is 0.006" and is also made of a suitable CRES material. A suitable stop off agent 48 is applied to each side of the first slip sheet 44. The stop off agent 48 also designated by the letter "B" is preferably the same material as that of the stop off agent 26.

Similarly, a suitable stop-off agent 50 designated "AY" in the FIGURES is applied to the surface of the second slip sheet 46 which faces the upper surface of the panel 12. The stop off agent 50 is preferably the material as that of the stop off agent 28 previously described.

To ensure that the upper and lower face sheets 16 and 18 of the panel 12 are properly brazed to the honeycomb layer 14 of such panel 12 it has been found desirable to surround the panel 12 with a layer of unbonded honeycomb core 52 termed a "tooling core" for purposes of the present description of the invention. The tooling core 52 comprises a central honeycomb core layer 54 and upper and lower face sheets 56 and 58 which are not bonded to the central honeycomb core layer 54. By positioning the tooling core layer 52 having the same height as the adjacent portion of the panel assembly 12 around the perimeter of the panel 12 and in close proximity to it, it is assured that the pressure applied by the flexweight pan 32 to the panel 12 is equally applied to the outer edges of the panel 12 as to the center of such panel thereby assuring that the face sheets 16 and 18 are fully bonded to the honeycomb layer 14 at the outer edges of such panel.

By interposing the layer of working core 38 between the weighted flexweight pan 32 and the panel 12 to be brazed causes the pressure exerted downwardly by the weighted pan 32 to be diffused by the working core 38 and eliminate the localized heavy spots encountered by the prior art methods. The flexibility or conformability of the working honeycomb core layer 38 serves to minimize small offsets between the parts of the panel 12 and any tooling aids used to maintain dimensional relationships. Thus, the arrangement of the novel invention serves to prevent disbonds in areas of low pressure and possible misalignment or unwanted core dissolution in areas of high pressure.

It should be recognized that the working honeycomb layer 38 of the present invention permits increased heat-up rates for the brazing of the panel 12 as the honeycomb core layer 38 is free to expand or contract without dragging the thin face sheets 16 and 18 of the panel 12 along with it. As an example of how use of the novel invention can reduce the total brazing cycle for a metallic aerostructure panel, in one application for a specific panel the total braze cycle was reduced from 26 hours to 8 hours. Such a dramatic reduction in the braze cycle obviously results in many advantages such as reducing the cost of brazing an aerostructure panel, improving the characteristics of the metal panel, reducing wear and tear on the furnace in which such brazing is conducted, and significantly increasing the throughput for a manufacturing cycle.

This novel arrangement also permits measurement of the temperature on a face sheet of the panel 12 during the brazing cycle by permitting a thermocouple arrangement to be extended through the working honeycomb core layer to be placed in direct contact with a face sheet of the aerostructure panel to be brazed or in direct contact with a slip sheet that is adjacent to a face sheet of the panel 12.

It should be noted also that while the particular embodiment of the invention illustrated in FIG. 1 shows the working honeycomb core layer 38 to be positioned between the flexweight pan 32 and the panel 12 to be brazed because the thicknesses of the face sheets 16 and 18 are the same, it would be within the scope of the invention to position the working honeycomb layer 38 between the lower face sheet 18 and the graphite base 20 in the event that the upper face sheet 16 were to be thinner than the lower face sheet 18. It has been found that the quality of the resultant aerostructure panel 12 is enhanced when the working honeycomb core 38 is placed adjacent to the face sheet of greater thickness.

It should also be understood that while the novel invention has been illustrated in the fabrication of a simple metallic panel it may be adapted easily for the fabrication of more complex shapes and configurations. For example, the novel invention may be easily adapted to allow for small housings or penetrations within the panel 12 or to provide extensions from such panel. Accordingly, it would be would be well within the scope of the present invention to adapt the working honeycomb core and the slip sheets to accommodate such changed configurations.

Figure 2:
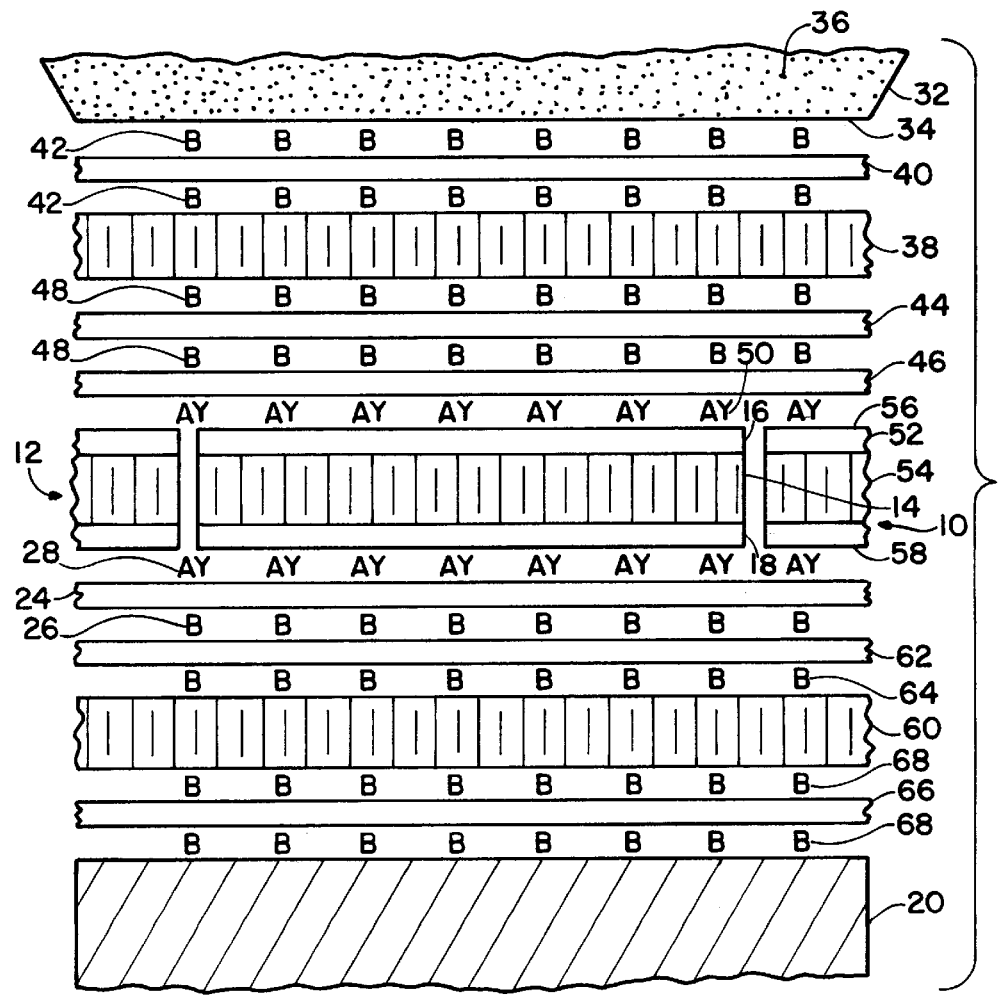
FIG. 2 is a slightly exploded sectional view of a second embodiment of the tooling arrangement of the present invention.

Referring now to FIG. 2, another preferred embodiment of the invention is illustrated. Like numerals refer to like elements in both of the FIGURES. FIG. 2 illustrates an embodiment of the invention where it is advantageous to provide a first working honeycomb core layer 38 between the flexweight pan 32 and the panel 12 and to provide a second working honeycomb core layer 60 between the panel 12 and the graphite base 20. In such an arrangement a second slip sheet 62 having an exemplary thickness of 0.002" and constructed of the same material as the other slip sheets is interposed between the upper surface of the lower working core layer 60. The slip sheet 62 is provided on its lower surface with a suitable layer of a suitable lubricant or stop-off agent 64 that is composed of the same material as the lubricants 26 and 48. Also, a suitable slip sheet 66 having an exemplary thickness of 0.002" and composed of the same material as the other slip sheets in interposed between the lower face of the working honeycomb core layer 60 and the tooling base 20. The slip sheet 66 is suitably coated on both sides with a suitable lubricant or stop-off agent 68 that is composed of the same materials as the lubricants 48 and 64.

The present disclosure includes that contained in the appended claims as well as that of the foregoing description. Although this invention has been described in its preferred forms with a certain degree of particularity, it is understood that the present disclosure of the preferred forms has been made only by way of example and numerous changes in the details of construction and combination and arrangement of parts and method steps may be resorted to without departing from the spirit and scope of the invention.

What is claimed is:

1. A method of brazing together a lightweight metallic aerostructure sandwich panel having at least two spaced face sheets and an intermediate honeycomb core layer which comprises:

providing a tooling base having a determinable upper surface;

assembling spaced upper and lower metal face sheets and an intermediate metal honeycomb core layer together with at least one layer of braze material upon said upper surface of the tooling base to provide an unbrazed aerostructure panel;

positioning a layer of conformable honeycomb core upon said upper face sheet;

positioning a pressure means upon said layer of conformable honeycomb core for providing a downward pressure upon said layer of honeycomb core and causing said honeycomb core to provide a uniform downward pressure over the upper face sheet of said unbrazed aerostructure panel, and subjecting said unbrazed aerostructure panel to a predetermined cycle of elevated temperature and time to permit the layer of braze material to be melted and thereby provide a brazed integral aerostructure panel.

2. The method of claim 1 wherein said pressure means is provided by a metallic pan having a conformable metal bottom surface and having metallic pellets distributed in said pan over said bottom surface to provide weight to said pan.

3. The method of claim 2 which further includes the step of interposing slip sheet means between the layer of conformable honeycomb core and said upper face sheet of said aerostructure panel to preclude any tendency of said upper face sheet to wrinkle during the braze cycle.

4. The method of claim 3 which further includes the step of interposing slip sheet means between the layer of conformable honeycomb core and said metallic pan.

5. The method of claim 4 which further includes the step of interposing a lubricating agent means on each side of each slip sheet means.

6. The method of claim 5 which further includes the step of interposing a lower layer of conformable honeycomb core between said upper surface of said tooling base and the lower face sheet of the aerostructure panel to be brazed.

7. The method of claim 6 which further includes the step of interposing slip sheet means between said lower layer of conformable honeycomb core and said upper surface of said tooling base and between the lower layer of deformable honeycomb core and said lower face sheet of the aerostructure panel to be brazed.

8. The method of claim 1 which further includes positioning a tooling conformable honeycomb core layer, having a thickness equal to the thickness of the aerostructure panel to be brazed and comprising an intermediate layer of honeycomb core and loosely contacting upper and lower face sheets, around the outer horizontal perimeter of the aerostructure panel to be brazed to ensure that the pressure exerted by the pressure means is uniformly applied to the outer edge of such aerostructure panel to ensure that the outer horizontal perimeter of such panel is brazed.

9. The method of claim 8 which further includes the step of positioning an additional layer of conformable tooling honeycomb core between the tooling base and the lower face sheet of the aerostructure honeycomb panel to be brazed.

10. The method of claim 9 which further includes the steps of interposing lubricated slip sheet means between the additional layer of honeycomb core and the base sheet and between such additional layer of honeycomb core and the aerostructure panel to be brazed.

11. An arrangement for brazing a lightweight metallic aerostructure panel having at least two opposing metal face sheets and a central metal honeycomb core layer, which comprises:

a tooling base having a determinable upper surface;

an aerostructure panel having at least upper and lower facing sheets that are to be brazed to a central honeycomb core layer to provide a unitary aerostructure honeycomb sandwich panel and being positioned on said upper surface of the tooling base;

a conformable working honeycomb core layer disposed on an upper surface of said upper facing sheet of said aerostructure panel so as to conform to the configuration of said upper facing sheet, and a pressure means disposed on an upper surface of said working honeycomb core layer to provide uniform downward pressure on said honeycomb core and thereby cause a uniform pressure to be exerted upon the aerostructure panel when it is subjected to a brazing cycle having an elevated temperature for brazing together the elements of the panel without wrinkling of the face sheets of such aerostructure panel.

12. The arrangement of claim 11 wherein said pressure means comprises a pan having a conformable bottom surface and quantity of metallic pellets uniformly disposed in said pan.

13. The arrangement of claim 12 wherein said conformable bottom surface of the pan is a metallic relatively thin conformable sheet that receives a uniform layer of metallic pellets to provide a pressure surface that exerts a pressure on the working honeycomb core layer to thereby apply a uniform pressure to the upper face sheet of the aerostructure panel to be brazed together.

14. The arrangement of claim 13 wherein lubricated slip sheet means are disposed between the upper face sheet of the aerostructure panel and the working honeycomb core layer and between the working honeycomb core layer and the pressure means and between the lower face sheet of the aerostructure panel and the tooling base.

15. The arrangement of claim 14 wherein an additional layer of working honeycomb core is positioned between the tooling base and the lower face sheet of the aerostructure panel to be brazed.

16. The arrangement of claim 15 wherein a layer of conformable tooling honeycomb core having non-fixed contacting upper and lower face sheets and having a thickness that is at least equal to the thickness of an adjacent portion of the aerostructure panel to be brazed is disposed around the outer perimeter of the aerospace panel to be brazed for operable cooperation with the upper tooling honeycomb core and the tooling base.

17. In an arrangement for brazing a lightweight metallic honeycomb sandwich panel which includes a tooling base for receiving a metallic honeycomb core panel comprising opposing upper and lower metallic face sheets and a central layer of metallic honeycomb core to be brazed together in a brazing cycle into a unitary aerostructure panel, and a pressure means to exert a pressure on the upper face sheet of the panel to insure intimate contact of such opposing face sheets and the central layer of honeycomb core during a brazing cycle, the improvement comprising:

a layer of flexible conformable working honeycomb core interposed between the upper face sheet of the honeycomb core panel to be brazed and the pressure means to ensure that the pressure exerted by such pressure means is uniformly applied over the upper face sheet of such panel during the brazing cycle.

18. The arrangement of claim 17 wherein lubricated slip sheet means are interposed between the working honeycomb core layer and both the aerostructure panel to be brazed and the pressure means.

19. The arrangement of claim 18 wherein an additional core layer having non-fixed contact with upper and lower face sheets and having a thickness substantially equal to the thickness of the aerostructure panel to be brazed is disposed around the outer perimeter of such panel and in operable contact with the tooling base and deformable working honeycomb core means to provide a uniform pressure to an outer face sheet of such aerostructure article.

20. The arrangement of claim 19 wherein an additional layer of conformable working honeycomb core is disposed between the tooling base and the lower face of the aerostructure panel to be brazed.

21. An arrangement for brazing a lightweight metallic aerostructure panel having at least two opposing metal face sheets and a central metal honeycomb core layer, which comprises:

a tooling base having a determinable upper surface;

an aerostructure panel having at least upper and lower facing sheets that are to be brazed to a central honeycomb core layer to provide a unitary aerostructure honeycomb sandwich panel and being positioned on said upper surface of the tooling base;

a conformable working honeycomb core layer disposed on an upper surface of said upper facing sheet of said aerostructure panel so as to conform to the configuration of said upper facing sheet;

a pressure means disposed on an upper surface of said working honeycomb core layer to provide uniform downward pressure on said honeycomb core and thereby cause a uniform pressure to be exerted upon the aerostructure panel when the panel is subjected to a brazing cycle having an elevated temperature for brazing together the elements of the panel without wrinkling of the face sheets of such aerostructure panel, wherein said pressure means comprises a pan having a conformable bottom surface and quantity of metallic pellets uniformly disposed in said pan, and said conformable bottom surface of the pan is a metallic relatively thin conformable sheet that receives a uniform layer of metallic pellets to provide a pressure surface that exerts a pressure on the working honeycomb core layer to thereby apply a uniform pressure to the upper face sheet of the aerostructure panel to be brazed together;

lubricated slip sheet means disposed between the upper face sheet of the aerostructure panel and the working honeycomb core layer and between the working honeycomb core layer and the pressure means and between the lower face sheet of the aerostructure panel and the tooling base; and an additional layer of working honeycomb core positioned between the tooling base and the lower face sheet of the aerostructure panel to be brazed, wherein a layer of conformable tooling honeycomb core having non-fixed contracting upper and lower face sheets and having a thickness that is at least equal to the thickness of an adjacent portion of the aerospace panel to be brazed is disposed around the outer perimeter of the aerostructure panel to be brazed for operable cooperation with the upper tooling honeycomb core and the tooling base.

22. In an arrangement for brazing a lightweight metallic honeycomb sandwich panel which includes a tooling base for receiving a metallic honeycomb core panel comprising opposing upper and lower metallic face sheets and a central layer of metallic honeycomb core to be brazed together in a brazing cycle into a unitary aerostructure panel, and a pressure means to exert a pressure on the upper face sheet of the panel to insure intimate contact of such opposing face sheets and the central layer of honeycomb core during a brazing cycle, the improvement comprising:

a layer of flexible conformable working honeycomb core interposed between the upper face sheet of the honeycomb core panel to be brazed and the pressure means to ensure that the pressure exerted by such pressure means is uniformly applied over the upper face sheet of such panel during the brazing cycle;

lubricated slip sheet means interposed between the working honeycomb core layer and both the aerostructure panel to be brazed and the pressure means; and an additional core layer having non-fixed contact with upper and lower face sheets and having a thickness substantially equal to the thickness of the aerostructure panel to be brazed which is disposed around the outer perimeter of such panel and in operable contact with the tooling base and deformable working honeycomb core means to provide a uniform pressure to an outer face sheet of such acrostructure panel.

23. In an arrangement for brazing a lightweight metallic honeycomb sandwich panel which includes a tooling base for receiving a metallic honeycomb core panel comprising opposing upper and lower metallic face sheets and a central layer of metallic honeycomb core to be brazed together in a brazing cycle into a unitary aerostructure panel, and a pressure means to exert a pressure on the upper face sheet of the panel to insure intimate contact of such opposing face sheets and the central layer of honeycomb core during a brazing cycle, the improvement comprising:

a layer of flexible conformable working honeycomb core interposed between the upper face sheet of the honeycomb core panel to be brazed and the pressure means to ensure that the pressure exerted by such pressure means is uniformly applied over the upper face sheet of such panel during the brazing cycle;

lubricated slip sheet means interposed between the working honeycomb core layer and both the aerostructure panel to be brazed and the pressure means;

an additional core layer having non-fixed contact with upper and lower face sheets and having a thickness substantially equal to the thickness of the aerostructure panel to be brazed which is disposed around the outer perimeter of such panel and in operable contact with the tooling base and deformable working honeycomb core means to provide a uniform pressure to an outer face sheet of such aerostructure panel; and an additional layer of conformable working honeycomb core disposed between the tooling base and the lower face of the aerostructure panel to be brazed.

24. An apparatus for brazing a metallic aerostructure panel comprising:

a tooling base having an upper surface which is capable of supporting a central honeycomb core having an upper and lower face, an upper face sheet adjacent to the upper face and a lower face sheet adjacent to the lower face;

at least one conformable honeycomb core; and a pressure means for providing pressure on the at least one conformable honeycomb core so that the at least one conformable honeycomb core exerts uniform pressure on at least the upper face sheet during a brazing cycle for brazing the upper and lower face sheets to the central honeycomb core.

25. The apparatus of claim 24, wherein the pressure means comprises a pan having a conformable bottom surface and quantity of metallic pellets uniformly dispersed in the pan.

26. The apparatus of claim 24, wherein at least one lubricated slip sheet is adjacent to the upper face sheet and at least one slip sheet is adjacent to the lower face sheet.

27. The apparatus of claim 24, wherein a conformable honeycomb core capable of exerting uniform pressure on the upper face sheet is located between the pressure means and the upper face sheet.

28. The apparatus of claim 24, wherein the apparatus comprises a first conformable honeycomb core capable of exerting uniform pressure on the upper face sheet, and a second conformable honeycomb core capable of exerting uniform pressure on the lower face sheet during the brazing cycle.

* * * * *

UNITED STATES PATENT AND TRADEMARK OFFICE
CERTIFICATE OF CORRECTION

PATENT NO.    : 6,199,742 B1
DATED         : March 13, 2001
INVENTOR(S)   : Good et al.

Page 1 of 1

It is certified that error appears in the above-identified patent and that said Letters Patent is hereby corrected as shown below:

Title page,
Item [57] ABSTRACT, line 13, "apressure" should read -- a pressure --

Column 3,
Line 64, "filly" should read -- fully --

Column 5,
Line 6, "Colinonoy" should read -- Colmonoy --
Line 11, "AL$_2$O$_3$" should read -- Al$_2$O$_3$ --

Column 9,
Line 40, "aerospace" should read -- aerostructure --

Column 10,
Line 53, "aerospace" should read -- aerostructure --

Column 11,
Line 17, "acrostructure" should read -- aerostructure --

Signed and Sealed this

Twenty-sixth Day of February, 2002

Attest:

*Attesting Officer*

JAMES E. ROGAN
*Director of the United States Patent and Trademark Office*